UNITED STATES PATENT OFFICE.

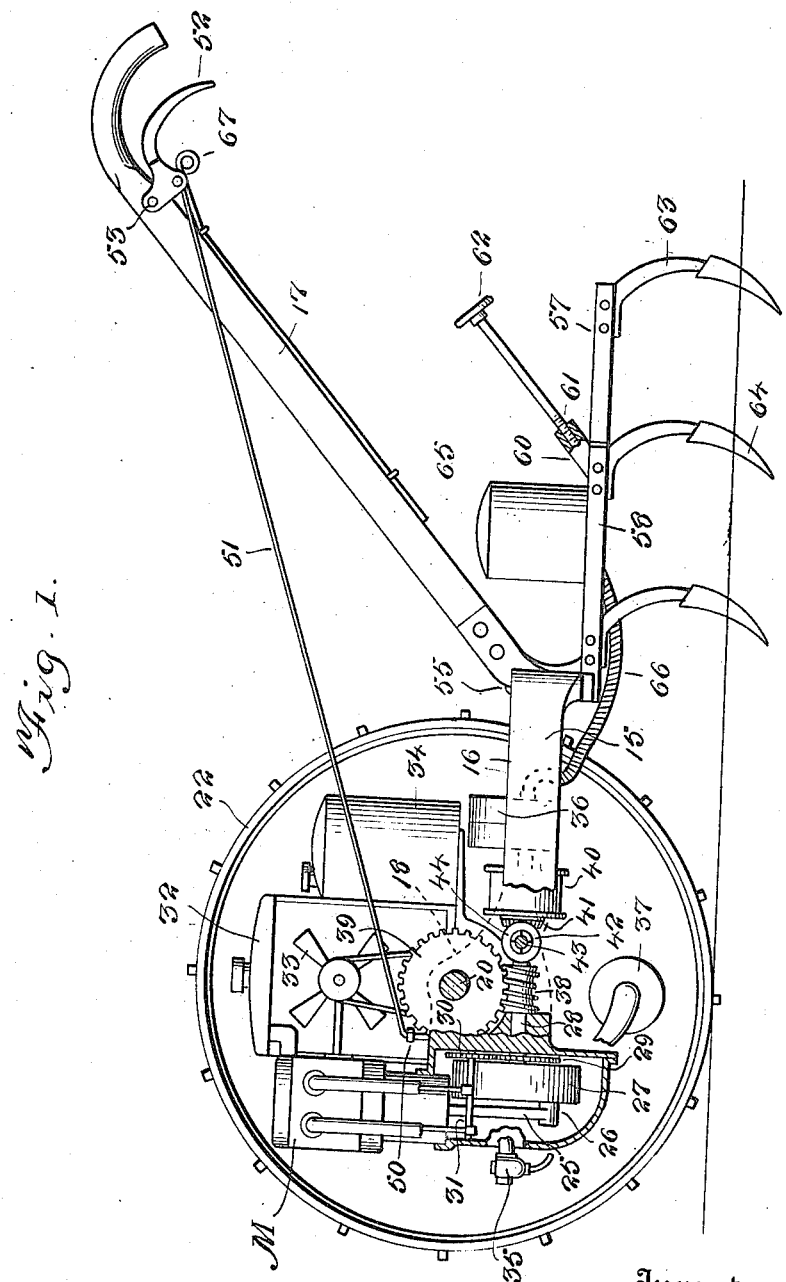

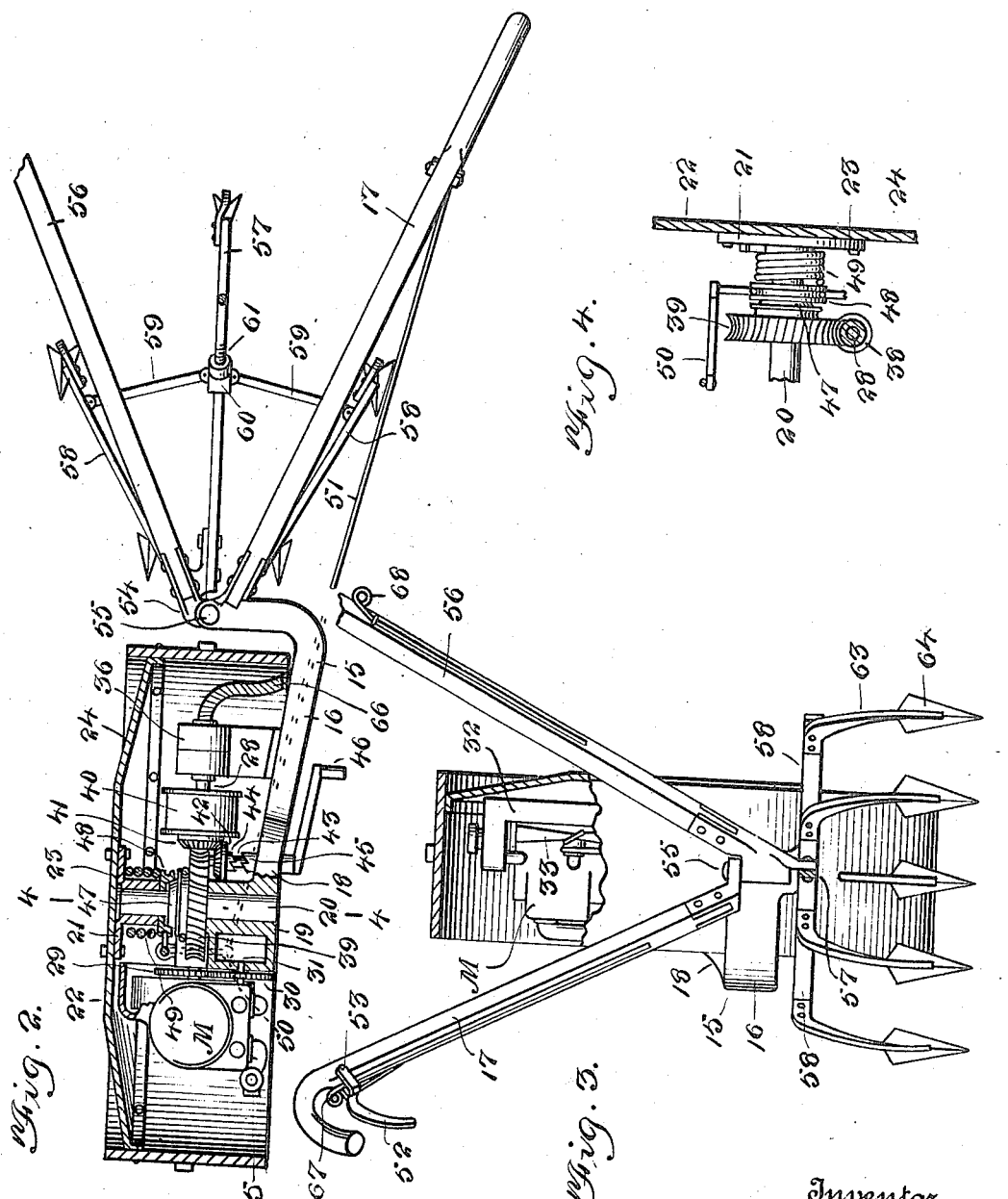

JAMES L. VAN NORT, OF LOS ANGELES, CALIFORNIA.

WHEEL-CULTIVATOR.

1,307,327.

Specification of Letters Patent.   Patented June 17, 1919.

Application filed November 24, 1917. Serial No. 203,813.

*To all whom it may concern:*

Be it known that I, JAMES L. VAN NORT, a citizen of the United States, residing at Los Angeles, in the county of Los Angeles and State of California, have invented new and useful Improvements in Wheel-Cultivators, of which the following is a specification.

This invention relates to cultivators, and has for its object the provision of a wheeled cultivator which is guided by a walking attendant with a separate guide control for the implement.

With these and other ends in view which will readily appear as the nature of the invention is fully understood, the same consists in the improved construction, arrangement and combination of parts which will be hereinafter fully described and particularly pointed out in the claims.

In the accompanying drawings there has been shown a simple and preferred form of the invention; it being, however, understood that no limitation is necessarily made to the precise structural details therein exhibited, but that changes, alterations and modifications within the scope of the appended claims may be made when desired.

In the drawings:

Figure 1 is a side elevation showing a tractor cultivator constructed in accordance with the invention.

Fig. 2 is a top plan view of the same, parts having been broken away.

Fig. 3 is a rear elevation partly in section.

Fig. 4 is a transverse sectional view taken on the line 4—4 in Fig. 2.

Corresponding parts in the several figures are designated by like characters of reference.

The main tractor frame 15 of the improved machine is provided at its rearward end with an angularly disposed bracket 16 with which a handle 17 is connected. The said main frame is provided near the front end thereof with a forwardly and upwardly extending arm 18 having an eye bearing 19 in which is fixed a shaft or axle 20 on which the hub 21 of the tractor wheel 22 is mounted for rotation, said wheel consisting of a broad rim or tire which is connected with the hub by means of a dished disk or plate 23 the central portion of which is secured on the hub, said disk being provided with an annular flange 24 which is bolted or otherwise secured on the inner face of the rim, near one edge of the latter. The tractor wheel thus constitutes a housing within which the motor and other parts are housed and whereby such parts are protected from the weather in addition to which a well balanced arrangement is attained.

Mounted on the forward part of the frame 15 is a motor M which has been shown as an internal combustion motor of a conventional one-cylinder, four-cycle type, the same having a piston rod 25 which is connected with the wrist pin 26 of the crank disk 27, the latter being mounted on the crank shaft 28. The latter carries a pinion 29 meshing with a spur wheel 30 on the cam shaft 31 which is thus driven. The motor is water cooled by means of a radiator 32 which is cooled by a suitably driven fan 33. 34 designates the fuel tank, 35 the carbureter, 36 magneto and 37 the muffler, all of which are of well known construction, said parts being mounted on the frame 16.

The main shaft 28 carries a worm 38 meshing with a worm gear 39 on the shaft or axle 20. The shaft 28 also carries a pulley or band wheel 40 and a bevel gear 41, the latter meshing with a beveled pinion 42 on a counter shaft 43, said beveled pinion having a ratchet clutch 44 adapted to be engaged by a corresponding clutch 45 on a hand crank 46 which may be utilized for spinning the shaft 28 when the motor has to be started.

The worm gear 39 which is normally loose on the shaft or axle 20 is provided with a clutch element 47 which is adapted for engagement with a clutch element 48 which is slidable on the axle 20, said clutch element 48 being normally impelled in the direction of the element 47 by means of a coiled spring 49 one end of which is connected with said clutch element 48, the other end of said spring being connected with the hub 21 of the tractor wheel. The clutch element 48 may be thrown out of engagement with the element 47 by means of a shifting lever 50 which in turn is actuated by a rod 51 actuated by a lever 52 which is fulcrumed at 53 on the handle 17.

A cultivator frame 54 is connected with the main frame 15 by means of a vertical bolt or pivot member 55 adjacent to the bracket 16. Connected rigidly with the cultivator frame is a handle 56 whereby said frame may be swung about the axis of the pivot member. The cultivator frame includes a rearwardly extending fixed or stationary beam 57 and pivoted side beams 58, the latter being connected by spreader links 59 with a sleeve 60 which is slidable on the center beam 57 on which it may be secured by means of a screw 61 having a handle 62. The beams 57 and 58 are provided with standards 63 carrying suitable blades or diggers 64, the construction of which may be varied to any desirable extent. The cultivator frame has been shown as supporting the seed box 65 the moving parts of which, not specially indicated, may be driven by means of a flexible shaft 66.

The handles 17 and 56 are respectively provided with slides 67 and 68 which are suitably connected respectively with the ignition and with the fuel control.

From the foregoing description taken in connection with the drawings hereto annexed, the operation and advantages of this invention will be readily understood. The device, it will be seen, is in the nature of a one-wheel tractor which may be utilized not only for the purpose of operating a cultivator or similar implement with which it may be connected, but also, through the medium of the pulley 40, for the purpose of driving light stationary machinery of any kind. The tractor may be guided by means of the handle 17 and the cultivator may be guided by means of the handle 56, the cultivator frame being capable of swinging, when actuated by said handle about the axis of the bolt or pivot 55. When the machine is started and the clutch 48 is thrown in, motion will be transmitted between the worm gear 39 and the tractor wheel through the medium of the spring 49, the latter serving to absorb the shock of a sudden start. The construction of the improved machine is simple and inexpensive and it may be conveniently applied to a great variety of useful purposes.

Having thus described the invention what is claimed as new is:

1. In a machine of the class described, a main frame having a laterally extending bracket at its rear end and also having an axle at its front end extending from the same side as the bracket, a wheel comprising a broad rim, a disk at one side of the broad rim and a hub connected to the disk, so that one side of the wheel is closed and the other is open, said frame extending into the open side of the wheel and having the axle engaged in the hub of the wheel, a handle extending from the rear end of the main frame and enabling the same to be guided, an auxiliary frame pivotally connected to the rear end of the main frame, and a handle attached to the front end of the auxiliary frame and enabling the latter to be turned to any desired angle with respect to the main frame.

2. In a machine of the class described, a main frame having an axle at its front end, a wheel on said axle and constituting the support for the front end of the frame, a handle extending from the rear end of the main frame and enabling the same to be guided, an auxiliary frame pivotally connected to the rear end of the main frame and a handle attached to the front end of the auxiliary frame and enabling the latter to be turned to any desired angle with respect to the main frame.

In testimony whereof I affix my signature.

JAMES L. VAN NORT.